(No Model.)

3 Sheets—Sheet 1.

C. B. WANAMAKER.
WEIGHING ATTACHMENT FOR CARS.

No. 439,215.

Patented Oct. 28, 1890.

WITNESSES.
F. Dean Rhodes
James Walsh.

INVENTOR.
Charles B. Wanamaker,
per C. & E. W. Bradford,
ATTORNEYS.

THE NORRIS PETERS CO., PHOTO-LITHO., WASHINGTON, D. C.

(No Model.) 3 Sheets—Sheet 2.

C. B. WANAMAKER.
WEIGHING ATTACHMENT FOR CARS.

No. 439,215. Patented Oct. 28, 1890.

WITNESSES:
F. Dean Rhodes.
James Walsh.

INVENTOR
Charles B. Wanamaker,
per C. & E. W. Bradford,
ATTORNEYS.

(No Model.)

C. B. WANAMAKER.
WEIGHING ATTACHMENT FOR CARS.

No. 439,215.

3 Sheets—Sheet 3.

Patented Oct. 28, 1890.

WITNESSES.
F. Dean Rhodes.
James Walsh.

INVENTOR.
Charles B. Wanamaker,
per C. & W. Bradford,
ATTORNEYS.

UNITED STATES PATENT OFFICE.

CHARLES B. WANAMAKER, OF INDIANAPOLIS, INDIANA, ASSIGNOR TO THE WANAMAKER CAR SCALE COMPANY, OF SAME PLACE.

WEIGHING ATTACHMENT FOR CARS.

SPECIFICATION forming part of Letters Patent No. 439,215, dated October 28, 1890.

Application filed January 7, 1890. Serial No. 336,155. (No model.)

*To all whom it may concern:*

Be it known that I, CHARLES B. WANAMAKER, a citizen of the United States, residing at Indianapolis, in the county of Marion and State of Indiana, have invented certain new and useful Improvements in Weighing Attachments for Cars, of which the following is a specification.

The object of my said invention is to produce a device by which the loads of cars, especially ordinary freight-cars, can be accurately weighed upon the cars themselves, wherever said cars may happen to be. Said invention will first be fully described, and then pointed out in the claims.

Figure 1:
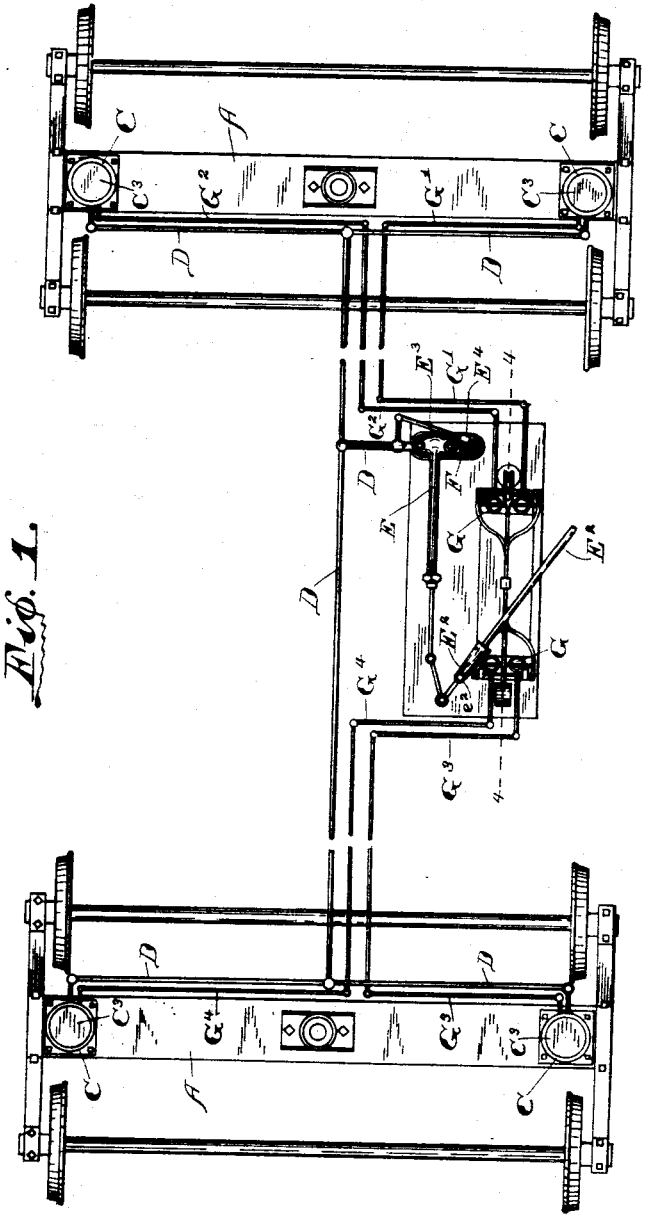
Figure 2:
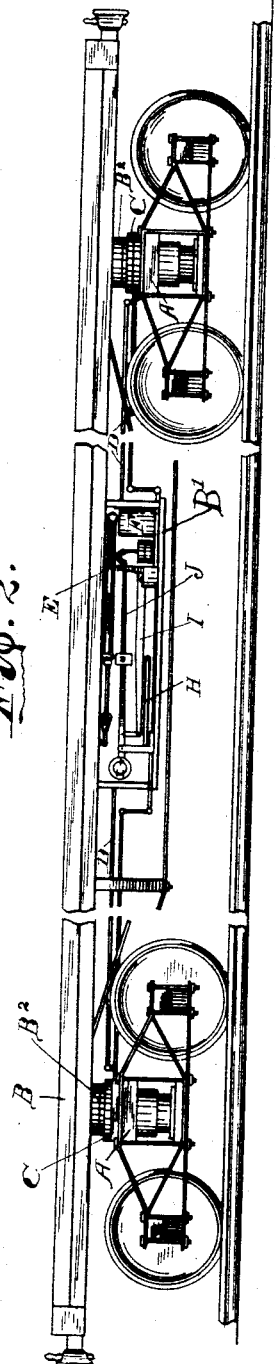
Figure 3:
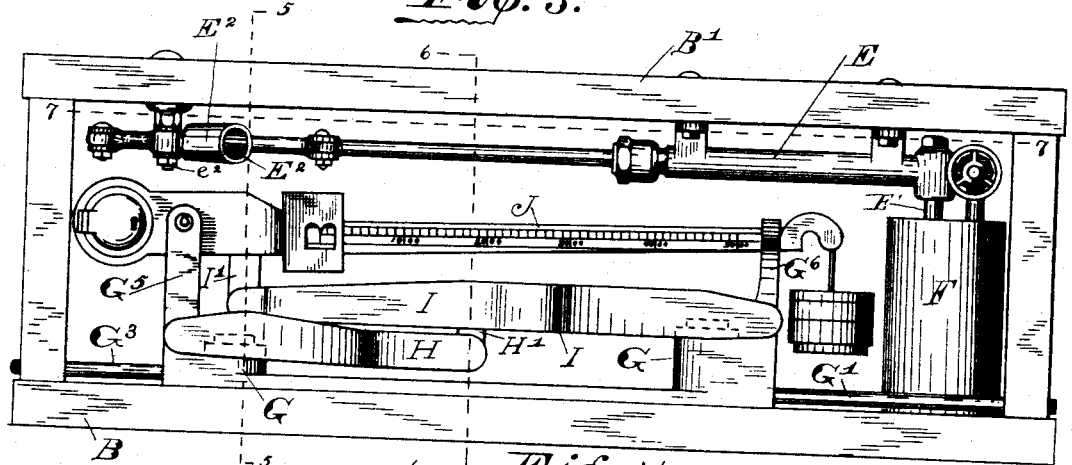
Figure 4:
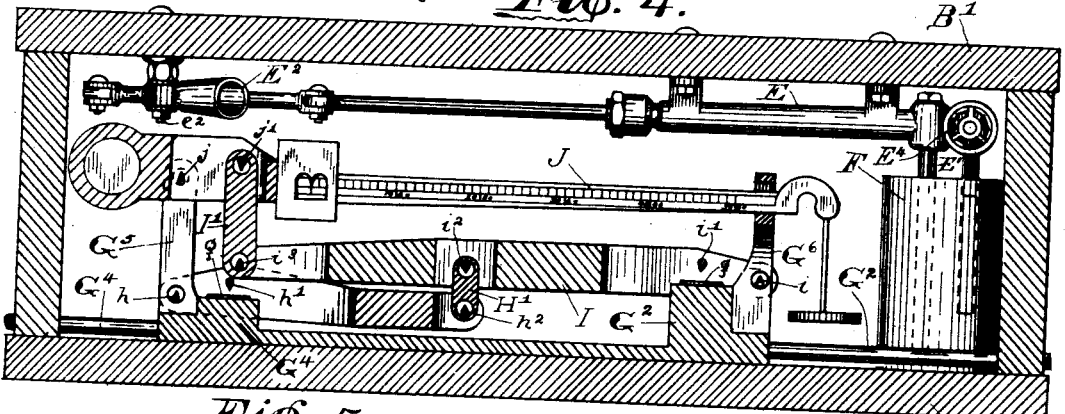
Figure 5:
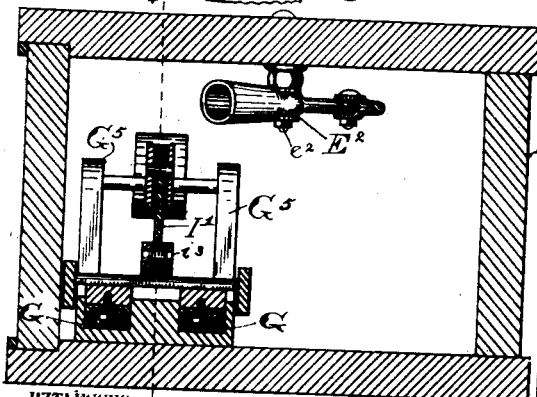
Figure 6:
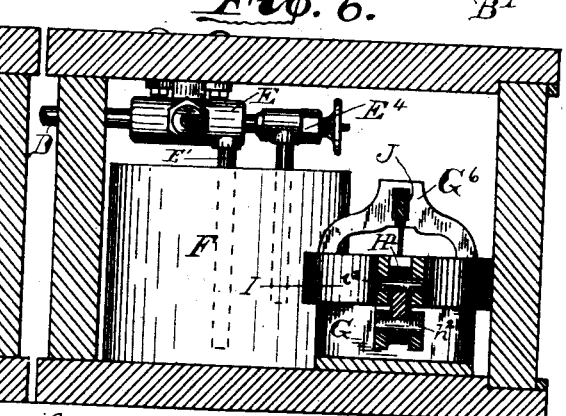
Figure 7:
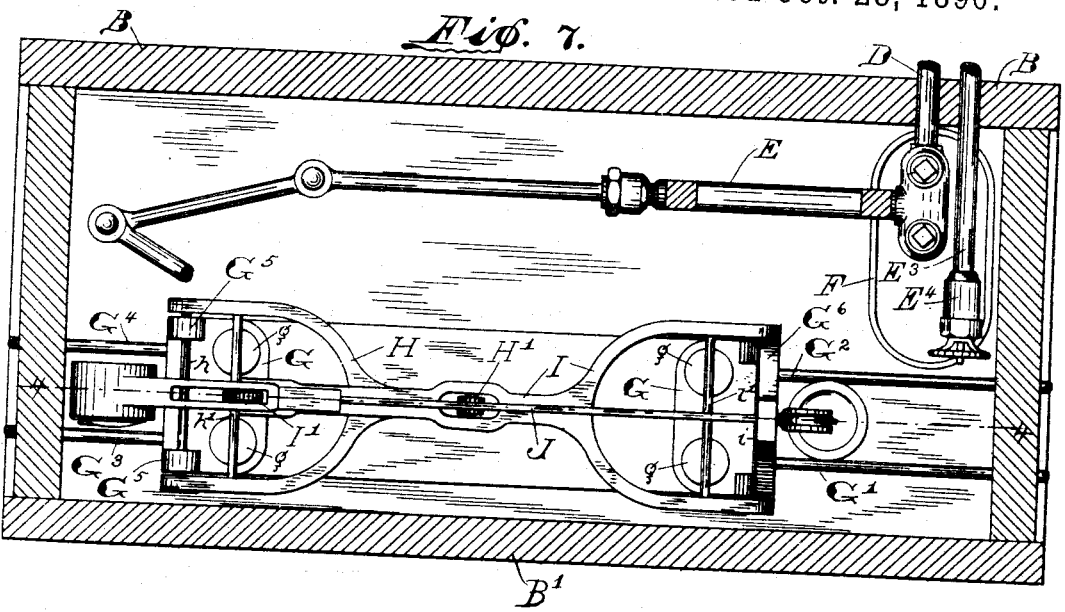
Figure 8:
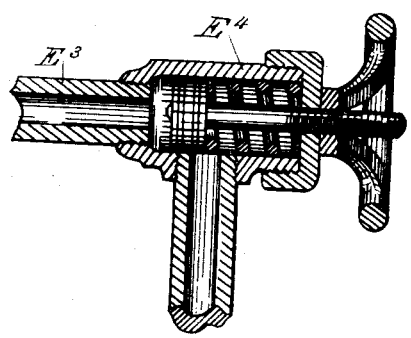
Figure 9:
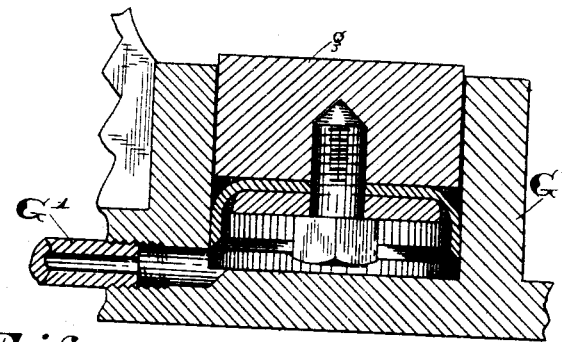

Referring to the accompanying drawings, which are made a part hereof, and on which similar letters of reference indicate similar parts, Figure 1 is a plan view of the running-gear of an ordinary freight-car, including a small plan of the scale apparatus included in my said invention; Fig. 2, a side elevation of such a car; Fig. 3, a side elevation of the weighing apparatus separately; Fig. 4, a central sectional view of said apparatus, on the dotted line 4 4 in Figs. 1 and 7, the various parts being shown in the position they occupy when the scale is at rest and out of engagement with the load; Fig. 5, a transverse sectional view looking toward the left from the dotted line 5 5 in Fig. 3; Fig. 6, a similar view looking toward the right from the dotted line 6 6 in Fig. 3; Fig. 7, a plan view as seen from the dotted line 7 7 in Fig. 3; Fig. 8, a sectional view of the by-path; Fig. 9, a sectional view of one of the scale-cylinders and immediately-adjacent parts; and Fig. 10 a sectional view of one of the cylinders at a corner of the car.

In said drawings the portions marked A represent the bolsters forming part of the ordinary running-gear of a freight-car; B, the platform or body of the car; C, cylinders mounted on the bolsters A at the four corners of the car; D, pipes connecting said cylinders with a pump; E, said pump; F, a tank containing a liquid, preferably oil, also connected with said pump; G, cylinders forming part of the scale apparatus and connected to the cylinders C by pipes $G'$ $G^2$ $G^3$ $G^4$; H and I, the two scale-levers, and J the scale-beam.

The running-gear, including the bolsters A and the platform or body of the car, is or may be generally of any ordinary or desired construction, and being no part of my present invention will not be further described herein, except incidentally in describing the invention. Underneath and secured to the platform or body B, however, is a box or casing $B'$, which incloses the scale mechanism, and the pipes leading from said scale mechanism to the cylinders on the bolsters are also attached to the under side of this body or platform, as will be readily understood. Attached to said platform or body B are also projections $B^2$ or equivalent suitable surfaces, with which the pistons in the cylinders C will come in contact in operation, and thus raise said platform and its load ready for weighing.

Figure 10:
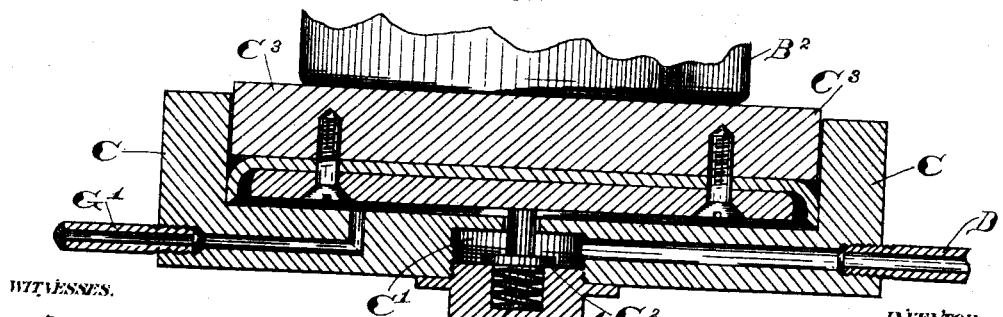

The cylinders C are mounted upon or attached to the bolsters A of the running-gear, and contain pistons $C^3$, adapted to come in contact with bearing-points, as $B^2$, on the under side of the body or platform of the car. As shown in Fig. 10, the pistons $C^3$ have packing upon their under sides, which prevents leakage when in use. In the same castings as the cylinders are chambers $C'$, which communicate by central openings with the seats upon which the pistons rest, and which also communicate with the pipes D, leading to the pump, while the pipes $G'$ $G^2$ $G^3$ $G^4$, which run from the cylinders, which are a part of the scale apparatus, lead from the piston-seats, as shown most plainly in Fig. 10. Centrally located in the chamber $C'$ and having stems which extend up through the openings leading to the piston-seats are small valves $C^2$, which preferably have springs $c^2$ below them, which cause them to follow the pistons as they rise, as shown most plainly in Fig. 10, and as will be readily understood. When the flanges on these valves reach the partitions which divide the chambers from the piston-seats, they operate to close the openings extending through from said chambers to said piston-seats, thus preventing any further supply of liquid from entering said piston-seats. The effect of this is (as the car is almost always somewhat unevenly loaded) that each corner is brought up successively to the same level. When the pump is operated, the effect is to force the liquid through the pipes D to the chambers and to the piston-seats. The lightest corner will, of course, be raised first, and it is so raised until the further passage of the liquid is shut off by the valve, as just described. The next heavier corner of the car is then raised in the same manner, and so on, until finally the heaviest corner of the car is raised. When this point in the operation is reached, the pump cannot be further operated, and the operator will become aware of the raising of all four corners of the car to the desired level by being unable to move the pump-handle any farther. The pressure (per square inch) in the cylinders forming part of the scale being obviously the same as that in the corresponding cylinders on the bolsters, the load is thus thrown onto said scale, and by manipulating the weights on the scale-beam the weight of the load can be ascertained in the ordinary and well-known manner. The pressure in the chamber C' being somewhat greater than that required to lift the heaviest-loaded corner of the body or platform, the valves $C^2$ are kept tightly closed thereby, and by their springs and the pressure from the pump is thus effectually kept from interfering with the operation of the scale, as will be readily understood.

The pipes D lead from the cylinders C to the pump E. They may be all of one size; but I prefer to make them of varying sizes according to the quantity of liquid passing through them. For that portion which extends from the pump to the point where the pipe first branches, one-half-inch pipe is a suitable size; from that point to where the pipes branch again leading to the individual cylinder, three-eighth-inch pipe is a suitable size, and from the last-named points to the cylinders themselves one-quarter-inch pipe is a suitable size.

The pump is or may be of any ordinary or desired construction. It is preferably securely mounted on the under side of the car, or attached to the top of the box inclosing the scale mechanism, and is connected, as just described, to the system of pipes D. It is also provided with a suction-pipe E', which extends down into the tank. It is operated by a handle or lever $E^2$, preferably pivoted to the top of the inclosing-casing, as shown, by a pivot $e^2$. Its handle, preferably, consists of a socket, which remains permanently in place, held by the pivot, and a removable lever adapted to be inserted in said socket. By this means a much longer handle may be used, and consequently greater leverage on the pump be obtained than could otherwise conveniently be done. Running by the pump from the pipe D to the tank F is a by-path pipe $E^3$ in which is a valve $E^4$. This valve is preferably a form of safety-valve, by the use of which a greater pressure than is desired is guarded against. In Fig. 8 I have shown a form of valve which will accomplish my purpose, in which a spring adjusted to a predetermined resistance rests upon the valve and holds it to its seat until its force is overcome by the pressure from the pump. This valve is also so constructed by means of a hand-wheel, lever, or other equivalent device that it may be opened whenever desired, and the liquid permitted to run back from the cylinders to the tank, which relieves the scale mechanism from the weight of the car-body and the load thereon.

The tank F is a tank of ordinary construction, and is preferably mounted in the same inclosure which contains the scale mechanism. It contains a liquid, preferably oil, adapted to be pumped into the cylinders, as described.

The cylinders G correspond in number to the cylinders C, and are respectively connected to said cylinders by the pipes G' $G^2$ $G^3$ $G^4$. Said pipes are preferably quite small, one-eighth-inch pipes being sufficient for the purpose. The connections are such that the aggregate average pressure in said cylinders, when the load is raised in accordance with the method of my invention, is equal to the aggregate average pressure (per square inch) upon the pistons in the cylinders C; and the combined pressure in the four cylinders being applied to the levers of the scale apparatus, enables the weight of the load on the platform or body of the car to be accurately taken, notwithstanding it may be unevenly distributed over said platform or body. The pistons $g$ of these cylinders G are adapted to come in contact with knife-edges $h'$ $i'$ on the scale-levers H and I and raise said levers, and thus throw the mechanism of the scale into operation. These pistons are provided with packing, as shown most plainly in Fig. 9, and, as will be seen by an examination of said figure, the construction is or may be of any ordinary or desired character. In order that the oscillations of the body or platform on the running-gear shall not strain the joints in the pipes and thus cause leakage, I prefer to make such of said joints as would be subjected to such a strain of the ball-and-socket or an equivalent variety. Joints of this character are formed in the pipes leading from the pumps to the cylinders C, as well as in the pipes leading from said cylinders to the cylinders G, forming part of the scale apparatus.

The scale-levers H and I are respectively mounted by means of ordinary knife-edges $h$ $i$ in holes formed in upright standards $G^5$ $G^6$, which standards are preferably cast integrally with the cylinders G. As will be noticed by an inspection of Fig. 4, when the liquid has been permitted to flow back into the tank and the scale is consequently out of use, the contact between these knife-edges and the parts against which they bear is reversed, so that they rest upon their backs, and thus are protected from wear at all times except when in actual use. This is a valuable feature, and the result is accomplished by the changes which I have made in the arrangement of the levers of the scale, and which forms the subject-matter of a separate application for Letters Patent, Serial No. 339,098. The scale-levers are connected together at the center by a link H', and the lever I is connected to the scale-beam by a link I'. The operation is, when the liquid is pumped into the cylinders, that the pistons $g$ in the cylinders G first raise these beams by coming in contact with the knife-edges $h'$ $i'$. The levers are then raised until the knife-edges $h$ $i$ come in contact with the upper sides of the lower holes in the standards $G^5$ $G^6$. As the scale-levers continue their upward course the knife-edges $h^2$ $i^2$ come in contact with those sides of the holes in the link H' which are nearest each other. The knife-edge $i^3$ next comes in contact with the upper side of the lower hole in the link I', forcing it up until the lower side of its upper hole comes in contact with the knife-edge $j'$ on the scale-beam J, and carries said scale-beam up until its knife-edge $j$ comes in contact with the upper side of the upper hole in the standard $G^5$. When this point is reached, all the scale parts are in operation and the apparatus is ready to weigh the load upon the car, which is done in the ordinary manner by the applying of weights and the moving of the weight on the beam in the ordinary and well-known manner.

As will be noticed by my invention, the links H' and I' operate under compression instead of tension, which enables me to secure obvious advantages, particularly that of dropping the knife-edges out of contact and consequent wear when the scale is not in operation.

The scale-beam J is mounted by means of its knife-edge $j$ in the holes in the upper ends of the standards $G^5$. Its forward end passes through an opening in the upper end of the standard $G^6$, and is steadied thereby. In most respects it is similar to an ordinary scale-beam, and operates in the usual well-known manner. So far as it is of peculiar construction, such construction is claimed in the aforementioned application for Letters Patent on the scale mechanism.

Having thus fully described my said invention, what I claim as new, and desire to secure by Letters Patent, is—

1. The combination, in a car or vehicle, of the running-gear, the body or platform, interposed cylinders, pipes leading from said cylinders to other cylinders forming part of a scale apparatus and to a pump, said pump, and said scale apparatus, whereby the load mounted on said body or platform can be weighed thereon without the use of any separate scale.

2. The combination, with the running-gear and the platform or body of a car or vehicle, of a hydraulic jack interposed between said running-gear and said platform or body, whereby the load can be raised and supported, and a scale apparatus connected thereto, whereby the weight of the load may be ascertained, said scale apparatus being mounted on said platform or body, substantially as set forth.

3. The combination, with the body or platform of a car or vehicle and the running-gear, of four cylinders mounted on said running-gear at or near the four corners of the vehicle, downwardly-projecting bearing-points or surfaces on said body or platform, with which the pistons in said cylinders will come in contact, four cylinders forming a part of the scale apparatus connected, respectively, with the four cylinders at the corners of the vehicle by suitable pipes, a pump also connected with said four cylinders at the corners of the vehicle by other pipes, and a scale apparatus adapted to be thrown into operative position by the force of the liquid coming from the four cylinders at the corners of the vehicle to the four cylinders connected therewith, substantially as set forth.

4. The combination, in a weighing apparatus, of a set of cylinders arranged to carry the load, chambers below the piston-seats in said cylinders, valves between said chambers and said piston-seats, a pump, pipes running from the pump to said chambers, a scale apparatus, and pipes running from said scale apparatus to said piston-seats.

5. The combination of a hydraulic jack arranged upon and adapted to lift the load of a car or vehicle, a scale apparatus connected thereto, a tank containing the liquid, and a cock and by-path, whereby the liquid may be returned to the tank and the scale apparatus thus released from operative condition, substantially as set forth.

6. The combination of a hydraulic jack arranged upon and adapted to lift the load of a car or vehicle, a scale apparatus connected thereto, a tank containing the liquid, a by-path whereby the liquid may be returned to the tank, and a valve in said by-path adapted to be opened by the pressure of the liquid therein when the predetermined pressure is reached, substantially as set forth.

In witness whereof I have hereunto set my hand and seal, at Indianapolis, Indiana, this 31st day of December, A. D. 1889.

CHARLES B. WANAMAKER. [L. S.]

Witnesses:
CHESTER BRADFORD,
JAMES WALSH.